United States Patent
Wang

(10) Patent No.: US 7,666,810 B2
(45) Date of Patent: Feb. 23, 2010

(54) ZIEGLER-NATTA CATALYST FOR HIGH TEMPERATURE POLYMERIZATION

(75) Inventor: Qinyan Wang, Calgary (CA)

(73) Assignee: NOVA Chemicals (International) S.A. (CH)

( * ) Notice: Subject to any disclaimer, the term of this patent is extended or adjusted under 35 U.S.C. 154(b) by 214 days.

(21) Appl. No.: 11/881,241

(22) Filed: Jul. 26, 2007

(65) Prior Publication Data

US 2008/0051534 A1    Feb. 28, 2008

(30) Foreign Application Priority Data

Aug. 25, 2006 (CA) .................................... 2557410

(51) Int. Cl.
*B01J 37/06* (2006.01)
(52) U.S. Cl. ................. 502/115; 502/103; 502/113; 502/119; 502/104; 526/124.2; 526/144; 526/348
(58) Field of Classification Search ............. 526/124.2, 526/144, 348; 502/103, 115, 113, 119, 104
See application file for complete search history.

(56) References Cited

U.S. PATENT DOCUMENTS

| 4,127,507 A | 11/1978 | Fannin et al. |
| 4,612,300 A | 9/1986 | Coleman, III |
| 5,589,555 A | 12/1996 | Zboril et al. |
| 6,031,056 A * | 2/2000 | Friederichs et al. ......... 526/144 |
| 6,723,677 B1 | 4/2004 | Estrada et al. |
| 2004/0033887 A1* | 2/2004 | Spaether ...................... 502/103 |

OTHER PUBLICATIONS

Chien, J.C., et al. J.Polym. Sci. Part A: Polym. Chem.27, 1989, pp. 1499-1514.
D.A. Skoog and D.M. West, Fundamentals of Analytical Chemistry, 4th Ed., CBS College Publishing, New York, 1982, Chapter 7, pp. 178-194.
D.A. Skoog and D.M. West, Fundamentals of Analytical Chemistry, 4th Ed., CBS College Publishing, New York, 1982, Chapter 12, pp. 276-303.

* cited by examiner

*Primary Examiner*—Ling-Siu Choi
(74) *Attorney, Agent, or Firm*—Kenneth H Johnson

(57) ABSTRACT

A magnesium titanium olefin polymerization procatalyst is prepared by A) reacting a diorganomagnesium compound with a source of active chlorine, (with the proviso that the amount of chlorine is insufficient to completely convert the diorganomagnesium to magnesium dichloride); then B) removing unreacted diorganomagnesium from the reaction product; then depositing a tetravalent titanium species on the reaction product. This procatalyst is highly active for the solution polymerization of olefins when combined with a cocatalyst.

13 Claims, No Drawings

ZIEGLER-NATTA CATALYST FOR HIGH TEMPERATURE POLYMERIZATION

FIELD OF THE INVENTION

This invention relates to catalysts for olefin polymerization, especially for use in solution polymerization processes.

BACKGROUND OF THE INVENTION

Magnesium-titanium catalysts for olefin polymerization are in wide commercial use. In general, these catalysts comprise a magnesium halide component (typically, magnesium dichloride) and a titanium component that is deposited on the magnesium dichloride. The catalyst is generally activated with a hydrocarbyl aluminum activator. The catalyst system is often used in supported form (with silica, alumina or silica-alumina supports being well known) but may also be used in the absence of such a support (in which case, the magnesium dichloride may be regarded as a "support").

The use of very finely divided magnesium halide particles is generally preferred. One well-known method to produce finely divided magnesium dichloride is to react a hydrocarbon soluble organomagnesium compound (such as diethyl magnesium) with a source of active chlorine. The active chlorine source is typically selected from the group consisting of 1) hydrochloric acid, HCl, 2) non-metallic halides such as isopropyl chloride, secondary butyl chloride or tertiary butyl chloride and 3) active metal chlorides, (especially aluminum organochlorides or aluminum trichloride).

The amount of active chlorine is typically specified to be sufficient to react with substantially all of the organic ligands on the organomagnesium compound, as described in U.S. Pat. No. 4,612,300.

A titanium species is generally then added to the magnesium chloride. The resulting magnesium-titanium complex is often referred to as a "procatalyst" because it requires a co-catalyst or an activator to produce a highly reactive polymerization catalyst system.

The procatalyst may be first synthesized then added to the polymerization reactor at a later time, as disclosed in U.S. Pat. No. 4,612,300. Alternately, the procatalyst may be prepared by an 'in-line mixing technique' (adjacent to a polymerization reactor) and added directly to the reactor, as disclosed in U.S. Pat. No. 6,723,677.

A hydrocarbyl aluminum species (especially triethyl aluminum) is commonly used as the co-catalyst or activator. It is generally preferred to add at least a portion of the co-catalyst/activator directly to the polymerization reactor.

Many of the original Ziegler-Natta catalysts were not sufficiently active to permit the catalyst residues to be left in the polymer without causing quality problems (such as polymer color and a propensity to degrade/oxidize the polymer in an undesirably short time period). Accordingly, there is a need for "high activity leave-in" catalysts, which are characterized by having less problematic catalyst residues that may be left in the finished polymer.

It is especially difficult to prepare a "high activity leave-in catalyst" for the solution polymerization of thermoplastic polyolefins because the comparatively high polymerization temperatures required for such polymerizations are known to cause the deactivation of magnesium-titanium catalysts.

We have now discovered a highly active magnesium-titanium catalyst that is especially suitable for the solution polymerization of thermoplastic polyolefins.

SUMMARY OF THE INVENTION

In one embodiment, the present invention provides a process to prepare an olefin polymerization procatalyst, said process comprising:
  Step a): forming a solid product by reacting:
    i) a diorganomagnesium compound defined by the formula MgRaRb, wherein each of Ra and Rb is independently selected from the group consisting of $C_1$ to $C_8$ hydrocarbyl groups, with
    ii) a source of active chlorine, wherein the mole ratio of chlorine in said active chlorine to the total moles of (Ra+Rb) is from 1.55 to 1.90/1;
  Step b): collecting said solid product from step a) and separating said solid product from said diorganomagnesium which did not react in said step a); adding to said solid product a tetravalent titanium chloride species of the formula: $TiCl_n(OR)_m$, wherein n is from 2 to 4 and n+m=4 and wherein OR is a ligand selected from the group consisting of alkoxy, aryloxy and mixtures thereof.

In another embodiment, the present invention provides a process to prepare an olefin polymerization catalyst by reacting the aforesaid procatalyst with an activator.

The present invention further provides an olefin polymerization process which comprises the reaction of the aforesaid polymerization catalyst with at least one alpha olefin under polymerization conditions.

DETAILED DESCRIPTION OF PREFERRED EMBODIMENTS

Diorganomagnesium

Diorganomagnesium compounds are well known and are commercially available. Diorganomagnesium compounds may be generally represented by the formula MgRaRb wherein each of Ra and Rb is a hydrocarbyl group. Preferably, each of Ra and Rb is selected from the group consisting of linear $C_1$ to $C_8$ hydrocarbyl groups.

It will be recognized by those skilled in the art that such diorganomagnesium compounds generally exist as highly viscous liquids or as unstable solids. This creates handling problems which may be overcome by "solvating" the compounds (i.e. adding the compounds to a liquid hydrocarbon). However, those skilled in the art will recognize that many of the simple diorganomagnesium compounds with straight chain lower alkyl groups are not highly soluble in hydrocarbon solvents. This problem may be mitigated through the use of a "solubilizing agent" such as an organoaluminum or organozinc compound (as discussed in U.S. Pat. No. 4,127,507; Fannin et al., incorporated herein by reference).

The diorganomagnesium compounds used in the present invention are preferably treated with such a "solubilizing agent" and are provided as a hydrocarbon "solution".

Preferred diorganomagnesium solutions are commercially available materials (such as those sold by Albermarle). Highly preferred diorganomagnesium compounds include hydrocarbon solutions of butyl ethyl magnesium or dibutyl magnesium (which have been treated with an organoaluminum compound to improve solubility and/or reduce solution viscosity).

Chlorine Amount and Chlorine Source

The use of magnesium dichloride in so-called "magnesium—titanium" polymerization catalysts is well known. The $MgCl_2$ is generally regarded as a "support" for the titanium.

The reaction of a diorganomagnesium compound with two mole equivalents of chlorine to produce magnesium dichloride is a well-known method to prepare catalyst supports.

However, the present invention requires that the magnesium "support" is prepared by the reaction of diorganomagnesium compound (described above) with less than 2 mole equivalents of chlorine.

Specifically, the chlorine/magnesium ratio in the "support" of this invention is from 1.55 to 1.90 per mole of magnesium (based on the amount of magnesium in the starting diorganomagnesium compound).

The source of chlorine is not essential to the present invention. The chlorine may be provided either as a compound which reacts "spontaneously" with the diorganomagnesium compound or as a compound which requires a "transfer agent" (as discussed in U.S. Pat. No. 6,031,056—the disclosure of which is incorporated herein by reference). For reasons of lower cost and simplicity, it is preferred to use a simple, but reactive, chlorine source such as HCl or tertiary butyl chloride, (as illustrated in the examples).

It will be appreciated by those skilled in the art that the diorganomagnesium compounds described above are highly reactive with the chlorine sources described above. In other words, there are no "special conditions" required to induce the reaction. Reaction temperatures of from 20 to 80° C. are preferred.

Removal of Unreacted Diorganomagnesium

As noted above, the present invention requires the use of less than the stoichiometric amount of chlorine required to prepare magnesium dichloride from the starting diorganomagnesium compound.

This means that some of the starting diorganomagnesium compound and/or a "Grignard reagent" may still be associated with the magnesium dichloride that is formed.

This intermediate product must then be separated from the unreacted diorganomagnesium. This may be done, for example, by simply decanting the solid reaction product from the solvent that contains unreacted diorganomagnesium (if the reaction is conducted in a solvent for the diorganomagnesium). This may be followed by a separate wash step with additional solvent. The use of at least one, and preferably two separate washings is preferred. We have observed that catalyst activity is greatly enhanced by the removal of the unreacted diorganomagnesium.

In a preferred embodiment, the solid reaction product is further washed (with solvent for the diorganomagnesium). This washing step may be readily optimized by those skilled in the art without undue experimentation. The solvent is one which is capable of dissolving the diorganomagnesium compound used in this invention. Preferred solvents are hydrocarbon solvents—especially cyclohexane.

While not wishing to be bound by theory, it is believed that this wash step removes substantially all of the unreacted diorganomagnesium. In contrast, any Grignard reagent which is present is not likely to be removed by the washing step because Grignard reagents are not highly soluble in the hydrocarbon solvents that are typically used to prepare commercially available diorganomagnesium compounds. As used herein, the term "Grignard reagent" is intended to convey its conventional meaning, namely an organomagnesium chloride compound. The Grignard reagent is formed because the diorganomagnesium compound is reacted with less than two mole equivalents of chlorine in the process of this invention.

Titanium IV Source

The procatalyst of this invention is then prepared by depositing a titanium (IV) compound on the above described compound.

The titanium (IV) compound is defined by the formula:

$$Ti(OR^7)_n(X)_m$$

wherein $R^7$ is a hydrocarbyl group which preferably contains from 1 to 20 hydrocarbon atoms;

X is chlorine;

m is greater than or equal to 2; and n+m=4.

Thus, ligand(s) $OR^7$ may be described as being selected from the group consisting of alkoxy, aryloxy and mixtures thereof.

Non-limiting examples of $OR^7$ include isopropoxide and butoxide.

The preferred titanium (IV) compound is titanium tetrachloride.

Magnesium/Titanium Mole Ratio

It will be recognized by those skilled in the art of magnesium-titanium polymerization catalysts that the catalyst activity can be influenced by the magnesium/titanium mole ratio. Preferred mole Mg/Ti ratios are from 5/1 to 10/1 for the catalysts of the present invention, i.e. from 5 to 10 moles of Mg are preferably present per mole of Ti in the catalyst.

Electron Donors

The use of electron donors is well known in the art of magnesium-titanium based olefin polymerization catalysts. The optional use of an electron donor is encompassed by this invention. However, it is preferred not to use an electron donor when the catalyst is used under solution polymerization conditions. Suitable electron donors are well known to those skilled in the art and include tetrahydrofuran (THF), dimethyl formamide, ethyl acetate and methyl isobutyl ketone.

Activators

Any "activator" which activates the above described magnesium/titanium procatalyst for olefin polymerization may be employed in the present invention.

Exemplary activators include aluminoxanes and organoaluminum cocatalysts.

The alumoxane may be of the formula:

$$(R^4)_2AlO(R^4AlO)_mAl(R^4)_2$$

wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each $R^4$ is methyl is the preferred alumoxane.

Alumoxanes are well known as cocatalysts, particularly for metallocene-type catalysts. Alumoxanes are also readily available articles of commerce.

The use of an alumoxane cocatalyst generally requires a mole ratio of aluminum to the transition metal in the catalyst from 20:1 to 1000:1. Preferred ratios are from 50:1 to 250:1.

Preferred activators are simple organoaluminum compounds defined by the formula:

$$Al(R^1_a)_m(OR^1_b)_n(X)_p$$

Wherein $R^1_a$ and $R^1_b$ are each independently $C_1$ to $C_{20}$ hydrocarbyl groups;

X is a halide;

m+n+p=3;

and m≧1.

Preferred organoaluminum compounds include triethyl aluminum, triisobutyl aluminum and (most preferably) diethyl aluminum ethoxide. When using these organoaluminum activators, preferred Al/Ti ratios are from 0.5/1 to 50/1, based on the moles of Ti in the procatalyst. Solution polymerization processes are preferably conducted with a comparatively low Al/Ti mole ratio (preferably 0.5/1 to 5/1, especially 1/1 to 3/1) while gas phase polymerizations are preferably conducted with comparatively high Al/Ti mole ratios (especially 20/1 to 30/1).

Solution processes for the (co)polymerization of ethylene are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution process is from about 80 to about 300° C. (preferably from about 120 to 250° C.). However, as is illustrated in the Examples, the polymerization temperature for the process of this invention is preferably above 160° C. The upper temperature limit will be influenced by considerations which are well known to those skilled in the art, such as a desire to maximize operating temperature (so as to reduce solution viscosity). While still maintaining good polymer properties (as increased polymerization temperatures generally reduce the molecular weight of the polymer). In general, the upper polymerization temperature will preferably be between 200 and 300° C. (especially 220 to 250° C.). The most preferred reaction process is a "medium pressure process", meaning that the pressure in the reactor is preferably less than about 6,000 psi (about 42,000 kiloPascals or kPa). Preferred pressures are from 10,000 to 40,000 kPa, most preferably from about 2,000 to 3,000 psi (about 14,000-22,000 kPa).

Suitable monomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

The polyethylene polymers which may be prepared in accordance with the present invention are preferably LLDPEs (i.e. linear low density polyethylene) which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc—the so-called very low and ultra low density polyethylenes.

Generally the alpha olefin may be present in an amount from about 3 to 30 weight %, preferably from about 4 to 25 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 40 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen and other polar impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components may be premixed in the solvent for the reaction or fed as separate streams to the reactor. In some instances premixing it may be desirable to provide a reaction time for the catalyst components prior to entering the reaction. Such an "in line mixing" technique is described in a number of patents in the name of DuPont Canada Inc (e.g. U.S. Pat. No. 5,589,555 issued Dec. 31, 1996).

EXAMPLES

Chemicals and Reagents

Purchased cyclohexane was dried and deoxygenated by passing it through a bed of deoxygenation catalyst (brand name R311 from BASF), an alumina bed (brand name Selexsorb COS/CD), and a molesieve (3A/13X) bed.

20 wt % Butylethyl Magnesium (BEM) in heptane solution was purchased from Akzo Nobel.

25.1 wt % Triethyl Aluminum (TEAL) in hexane solution was purchased from Akzo Nobel.

25.4 wt % Diethylaluminum Ethoxide (DEAO) in heptane solution was purchased from Akzo Nobel.

A drying reagent with a "built in" dryness indicator (Drierite™) was purchased from Aldrich. The drying reagent was conditioned before use by drying it at 130° C. overnight followed by a secondary overnight drying step at 220° C. in a vacuum oven.

2-chloro-2-methylpropane (tert-butyl chloride or tBuCl) was purchased from Aldrich. The tBuCl was dried by placing it over the pre-dried drying reagent under an inert environment for approximately 16 hours at a ratio of 30 g of dryness indicator per 100 mL of tBuCl. The flask containing the tBuCl was covered in foil to shield it from light during this process to minimize the formation of isobutylene. The dried tBuCl was further purified by vacuum transfer. The tBuCl moisture content was 12 ppm or less and had a purity above 97% after purification. All glassware used in this procedure was dried in a 120° C. oven overnight.

Ethylene was purchased from Praxair as polymer grade. The ethylene was purified and dried by passing the gas through a series of purification beds including alumina (brand: Selexsorb COS), molesieve (type: 13X), and a deoxygenation bed (brand: Oxiclear®).

Argon was purchased from Praxair as UHP grade. The argon was purified and dried by passing the gas through a series of purification beds including Selexsorb COS alumina, molesieve 13X, and an Oxiclear® deoxygenation bed.

Purchased 1-octene was dried by storing a 1-liter batch over molesieve 3A.

Titanium (IV) chloride ($TiCl_4$) was purchased from Aldrich as 99.9% purity packaged under nitrogen.

Methanol was purchased as GR ACS grade from EMD Chemicals.

Analytical Methods

Polymer molecular weights and molecular weight distributions were measured by gel permeation chromatography (GPC). The instrument (Waters 150-C) was used at 140° C. in 1,2,4-trichlorobenzene and was calibrated using polyethylene standards.

Polymer branch frequencies were determined by FT-IR. The instrument used was a Nicolet 750 Magna-IR spectrophotometer.

All of the catalyst samples were analyzed for titanium valence distribution. A redox titration method for titanium valence distribution was developed based on a scientific paper (Chien, J. C. et. al, *J. Polym. Sci. Part A: Polym. Chem.* 27, 1989, 1499-1514) and an ultraviolet (UV) method for titanium content analysis was developed based on ASTM standard E878-01.

Filtrate analysis for chloride, aluminum and magnesium was carried out at the $MgCl_2$ step. The chloride content in the filtrate was determined by precipitation titration with $AgNO_3$ based on principles described by Skoog et al. (D. A. Skoog and D. M. West, Fundamentals of Analytical Chemistry, $4^{th}$ Ed., CBS College Publishing, New York, 1982, Chapter 7, pp 178-194). The contents of aluminum and magnesium were determined by complex formation titration using EDTA as complexing reagent based on principles described by Skoog et al. (D. A. Skoog and D. M. West, Fundamentals of Analytical Chemistry, $4^{th}$ Ed., CBS College Publishing, New York, 1982, Chapter 12, pp 276-303).

Part A: Catalyst Synthesis

1. Catalyst Family 1

All different catalyst family 1 derivatives were prepared using essentially the same laboratory techniques. Table 1 shows the variables in catalyst composition that were studied. The variables include Mg:Ti mole ratio (7.5 and 10) and Cl:Mg mole ratio (Cl/Mg=1.55 to 1.9) as indicated in Table 1.

All glassware was dried overnight in a 130° C. oven. Any supplies that could not be dried in the oven, such as gas tight syringes and septa, were dried overnight under dynamic vacuum in the large antechamber of a glovebox. All glassware and supplies were allowed to cool to room temperature in the glovebox before beginning.

In a glovebox, 6.98 g of a pre-prepared 20:1 BEM/TEAL solution was weighed into a 3-necked 500 mL round bottom flask (rbf). 300 mL of cyclohexane was added to the flask using a 250 mL graduated cylinder. The flask was clamped so that it rested in a silicone oil bath. The necks of the rbf were equipped with 1) a septum with a thermocouple wire inserted into the reaction solution; 2) overhead stirring; and 3) a Vigreaux column with a septum and a vent needle. Overhead stirring was started at 400 rpm, and the reaction was heated to 50° C. in the oil bath. 2.48 mL of tBuCl (catalyst 1E in Table 1) was added by a 5 mL gas-tight syringe. There was immediate formation of a white solid ($MgCl_2$) and an exotherm was observed (exothermic temperature was about 60° C.). The reaction was stirred for 1 hour.

The $MgCl_2$ was filtered on a filterstick, washed with 5×10 mL cyclohexane, and was transferred to a 125 mL wide neck bottle with 100 mL cyclohexane. It was sonicated using a sonicating probe at 60% for 5 minutes to break up any agglomerated particles. The white suspension was transferred back into the 3-necked 500 mL rbf with an additional 200 mL of cyclohexane to give a total volume of 300 mL, and was set up as described before.

The reaction was heated to 50° C., and 4 mL of 0.422 mol/L $TiCl_4$ stock solution in cyclohexane was added by a gas tight syringe, causing the reaction to immediately turn brown.

The reaction was stirred for 1 hour and the catalyst was filtered on a filterstick. The brown solid was washed with 5×10 mL cyclohexane, then was transferred into a tared 100 mL wide-necked bottle for storage as a slurry.

TABLE 1

Catalyst 1 Preparation Conditions and Their Properties

| Catalyst | Cl:Mg | tBuCl (mL) | Mg:Ti | $TiCl_4$ (mL) | Ti % on solids | Ti(III)/Ti (%) | Ti(II)/Ti (%) |
|---|---|---|---|---|---|---|---|
| Catalyst 1A | 1.55 | 2.15 | 7.5 | 4.0 | 5.06 | 89 | 0.00 |
| Catalyst 1B | 1.60 | 2.20 | 7.5 | 4.0 | 4.99 | 73 | 4.81 |
| Catalyst 1C | 1.70 | 2.35 | 7.5 | 4.0 | 4.45 | 76 | 2.47 |
| Catalyst 1D | 1.75 | 2.40 | 7.5 | 4.0 | 5.25 | 84 | 0.00 |
| Catalyst 1E | 1.80 | 2.48 | 7.5 | 4.0 | 5.26 | 76 | 2.28 |
| Catalyst 1E' | 1.80 | 2.48 | 7.5 | 4.0 | 3.19 | 70 | 8.5 |
| Catalyst 1E" | 1.80 | 2.48 | 7.5 | 4.0 | 3.89 | 79 | 2.0 |
| Catalyst 1E''' | 1.80 | 2.48 | 7.5 | 4.0 | 3.32 | 70 | 2.0 |
| Catalyst 1F | 1.90 | 2.60 | 7.5 | 4.0 | 4.40 | 68 | 8.86 |
| Catalyst 1G | 1.80 | 2.48 | 10.0 | 3.0 | 4.62 | 69 | 0.00 |

The data in Table 1 show the titanium valence distribution calculated for the solid equivalent. These numbers are an approximation only (for comparison purposes) and were not used in any further calculations.

Comparative Catalysts

Each catalyst of Catalyst 2 family was made according to the procedure described for the equivalent Catalyst 1, but without the washing step.

TABLE 2

Catalyst 2 and Their Properties

| Catalyst | Cl:Mg | tBuCl (mL) | Mg:Ti | $TiCl_4$ (mL) | Ti % on solids | Ti(III)/Ti | Ti(II)/Ti |
|---|---|---|---|---|---|---|---|
| Catalyst 2B | 1.60 | 2.20 | 7.5 | 4.0 | 5.42 | 67.5 | 15.1 |
| Catalyst 2C | 1.70 | 2.35 | 7.5 | 4.0 | 4.92 | 53.6 | 24.3 |
| Catalyst 2E | 1.80 | 2.48 | 7.5 | 4.0 | 4.68 | 43.2 | 37.2 |

An essential step of this invention is to remove unreacted dialkyl magnesium (preferably, essentially all of the unreacted dialkyl magnesium) from the $MgCl_2$. This is preferably done by washing the $MgCl_2$. Analysis of the filtrate from the washing is provided in Table 3.

TABLE 3

MgCl$_2$ Filtrate Composition

| Filtrate | Filtrate Analysis | | | | | |
|---|---|---|---|---|---|---|
| | mmol Al | % Al | mmol Mg | % Mg | mmol Cl | % Cl |
| MgCl$_2$ | 2.88 | 87 | 3.16 | 6 | 0.00 | 0 |

Table 3 summarized the filtrate composition determined by titration. It showed presence of 87% Al and 6% Mg of total Al and Mg added during the catalyst synthesis. Due to absence of Cl in the filtrate, the Al and Mg compounds were assigned as Al alkyls and Mg alkyls, respectively. In summary, Al alkyls and Mg alkyls are washed out (and RMgCl was deposited on the solid catalyst).

Part B: Polymerization Experiments Set-up on Solution Semi-Batch Reactor (SBR2) and Continuous Polymerization Unit (CPU)

SBR2

SBR2 was a 1000 mL stirred semi-batch reactor purchased from Parr. The reactor was equipped with a pneumatically powered magnetic drive capable of stirring at 2000 rpm. The stirrer consisted of a pitched blade impeller coupled with a gas entrainment impeller to maximize gas dispersion in the liquid. A baffle was also placed in the reactor to enhance the turbulence within the liquid. The reactor was heated with an electric element style heater. SBR2 used a programmable logical control (PLC) system with purchased software for process control. A bottom drain valve attachment allowed for the discharge of hot polymer solution into a cooled letdown vessel. The line connecting the bottom drain valve to the letdown vessel was heat traced to 160° C. The entire system was housed in a nitrogen-purged cabinet to maintain an oxygen deficient environment during the polymerization process. All the chemicals (solvent, comonomer, catalyst and cocatalyst) were fed into the reactor batchwise except ethylene, which was fed on demand. The ethylene was stored in a 10 L vessel in which the temperature and pressure were continually monitored. All reaction components were stored and manipulated under an inert atmosphere of purified argon.

The reactor conditions used for this set of experiments are shown in Table 4.

TABLE 4

SBR2 Polymerization Conditions

| | |
|---|---|
| Temperature | 200° C. |
| Pressure | 275 psig |
| Diluent | 400 mL cyclohexane |
| Cocatalyst | Diethyl aluminum ethoxide (DEAO) |
| Al:Ti | 10 |
| Comonomer | 20 mL 1-octene |
| Scavenger | 0.38 mmol/L trioctyl aluminum (TNOL) |

The reactor was preheated to 200° C. The catalyst, cocatalyst and scavenger were injected into the transfer towers. The slurry catalyst was sonicated for five minutes before it was cannula transferred into the towers. 400 mL of purified cyclohexane and 20 mL of purified 1-octene were then transferred into the reactor. Ethylene was added to the reactor to a pressure of 100 pounds per square inch gauge (psig). The reactor was heated to the desired reaction temperature. Upon reaching the desired temperature, the reactor was charged with ethylene to the target pressure. The scavenger was displaced into the reactor using argon pressure at 500 psig in the headspace and allowed to stir for one minute. The catalyst and cocatalyst were displaced into the reactor using an argon pressure of 690 psig in the headspace. The polymerization times varied from one to five minutes depending on the ethylene consumed during the reaction. The polymerization was cut off at either 1) five minutes or 2) 500 mmol ethylene consumed, whichever came first. Five milliliters of methanol was injected into the polymer solution to terminate the polymerization. The polymer solution was dried in the fumehood. The activity was calculated based on the yield of polymer collected.

TABLE 5

Catalyst Performance on SBR2

| Catalyst | Cl:Mg | Mg:Ti | SBR run number | Activity (g PE/mmol cat * hr) |
|---|---|---|---|---|
| Catalyst 1A | 1.55 | 7.5 | 10233 | 3975 |
| Catalyst 1B | 1.60 | 7.5 | 10232 | 4844 |
| Catalyst 1C | 1.70 | 7.5 | 10235 | 5481 |
| Catalyst 1D | 1.75 | 7.5 | 10234 | 5398 |
| Catalyst 1E | 1.80 | 7.5 | 10236 | 2558 |
| Catalyst 1E''' | 1.80 | 7.5 | 10476 | 640.0 |
| Catalyst 1F | 1.90 | 7.5 | 10237 | 3686 |
| Catalyst 1G | 1.80 | 10.0 | 10226 | 3669 |
| Catalyst 2B | 1.60 | 7.5 | 10112 | 89.8 |
| Catalyst 2C | 1.70 | 7.5 | 10117 | 297.8 |
| Catalyst 2E | 1.80 | 7.5 | 10185 | 1015 |

Catalyst 1E''' was activated by (octyl)$_3$Al only with Al/Ti = 1.3

Continuous Polymerization

Continuous polymerizations were conducted on a continuous polymerization unit (CPU). The CPU contained a 71.5 mL stirred reactor and was operated between 160-250° C. for the polymerization experiments. An upstream mixing reactor having a 20 mL volume was operated at 5° C. lower than the polymerization reactor. The mixing reactor was used to preheat the ethylene, octene and some of the solvent streams. Catalyst feeds and the rest of the solvent were added directly to the polymerization reactor as a continuous process. A total continuous flow of 27 mL/min into the polymerization reactor was maintained.

The catalysts from Part A were added to the CPU in a slurry delivering system. The slurry delivery system consisted of an inverted, 1000 mL syringe pump with a 3500 mL stirred slurry reservoir. Slurry was transferred from a stirred bottle, via pressure differential, through a stainless steel cannula into the 3500 mL stirred slurry reservoir. The slurry was then diluted in the reservoir to the required concentration with purified cyclohexane. Once the slurry was transferred and diluted, it was stirred in the reservoir for a minimum of 15 minutes before any was transferred into the syringe pump. When the slurry was ready to be transferred to the reactor, an air actuated solenoid valve, which isolated the reservoir from the syringe barrel, was opened allowing slurry flow to the syringe barrel. The syringe barrel was then loaded to the desired volume at a flow of 25 mL/min, with constant stirring in the syringe barrel. When the syringe barrel was filled to the required volume, the solenoid valve to the reservoir was closed, isolating the syringe barrel from the reservoir. The syringe barrel was then brought up to the reactor pressure while still isolated from the reactor. When the syringe barrel has reached the reactor pressure, an air actuated solenoid valve (which isolated the syringe barrel from the reactor) was opened. The syringe pump was then calibrated and programmed to deliver the desired flow rate of slurry.

For the slurry catalyst experiments, copolymers were made at an octene/ethylene weight ratio of 0.5. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. Q is ethylene conversation (and determined by an online gas chromatograph (GC)) and polymerization activity Kp is defined as:

$$(Kp)(HUT)=Q((1-Q)(1/\text{catalyst concentration})$$

wherein Q is the fraction of ethylene monomer converted; HUT is a reciprocal space velocity (hold up time) in the polymerization reactor expressed in minutes and maintained constant throughout the experimental program; and the catalyst concentration is the concentration in the polymerization reactor expressed in mmol of Ti per liter.

Weight average molecular weight ("Mw") and polydispersity, or "Pd" (determined by dividing Mw by number average molecular weight, Mn) for the polymers are also shown. The column entitled Br/1000C atoms is an estimate of the number of short chain branches/1000 carbon atoms which is an indication of comonomer content.

A comparison of the data in tables 6 and 7 shows that the present catalysts have better high temperature (greater than 150° C.) performance than the comparative catalysts. Higher polymerization temperatures are desirable due to improved production efficiencies, particularly when recovering the solvent used in the polymerization process.

What is claimed is:

1. A process to prepare an olefin polymerization procatalyst, said process comprising:
   Step a): forming a solid product by reacting:
      i) a diorganomagnesium compound defined by the formula MgRaRb, wherein each of Ra and Rb is independently selected from the group consisting of $C_1$ to $C_8$ hydrocarbyl groups, with
      ii) a source of active chlorine, wherein the mole ratio of chlorine in said active chlorine to said Mg is less than 2 and the mole ratio of chlorine in said active chlorine to the total moles of (Ra+Rb) is from 1.55 to 1.90/1;
   Step b): collecting said solid product from step a) and separating said solid product from said diorganomagnesium which did not react in said step a); washing said solid product; adding to said solid product a tetravalent titanium chloride species of the formula: $TiCl_n(OR)_m$, wherein n is from 2 to 4 and n+m=4 and wherein OR is a ligand selected from the group consisting of alkoxy, aryloxy and mixtures thereof.

2. The process of claim 1 wherein the Mg/Ti mole ratio is from 5/1 to 10/1.

3. The process of claim 1 when conducted at a temperature of from 20° C. to 80° C.

TABLE 6

Testing of Catalyst 1E' and Catalyst 1E"

| Run# | Catalyst | Al/Ti ratio | Temp °C. | Q | Kp (1/mM * min) | Mw (*10$^{-3}$) | Pd | Br/1000C |
|---|---|---|---|---|---|---|---|---|
| 1 | Catalyst 1E" | 1.3 | 200 | 90.2 | 133.9 | 95.8 | 3.0 | 10.9 |
| 2 | Catalyst 1E" | 1.3 | 220 | 90.3 | 91.3 | 63.8 | 3.0 | 10.9 |
| 3 | Catalyst 1E" | 1.3 | 240 | 90.2 | 42.0 | 44.4 | 2.7 | 9.8 |
| 4 | Catalyst 1E" | 1.1 | 160 | 89.8 | 215.7 | 177.7 | 4.4 | 9.0 |
| 5 | Catalyst 1E' | 1.1 | 180 | 90.5 | 170.5 | 130.0 | 3.7 | 9.5 |
| 6 | Catalyst 1E' | 1.1 | 190 | 90.2 | 137.3 | 98.5 | 3.0 | 9.2 |
| 7 | Catalyst 1E' | 1.1 | 200 | 90.3 | 113.25 | 90.1 | 3.8 | 9.4 |
| 8 | Catalyst 1E' | 1.1 | 220 | 90.2 | 58.25 | 66.6 | 2.9 | 9.4 |

COMPARATIVE EXAMPLES

Catalyst 2E in Table 2 was tested the same way as described for Catalyst 1. Inline catalyst was tested under the control experiments conditions as described in U.S. Pat. No. 6,723,677. Comparative data are provided in Table 7.

4. The process of claim 1 wherein said tetravalent titanium chloride species is $TiCl_4$.

5. The process of claim 1 wherein said active chloride is selected from the group consisting of HCl, isopropyl chloride and tertiary butyl chloride.

TABLE 7

Comparative Examples

| Run# | Catalyst | Al/Ti ratio | Temp. °C. | Q | Kp (1/mM * min) | Mw (*10$^{-3}$) | Pd | Br/1000C |
|---|---|---|---|---|---|---|---|---|
| 9 | Catalyst 2E | 1.5 | 200 | 91.8 | 25.6 | 61.3 | 3.1 | 11.0 |
| 10 | Inline catalyst | 1.6 | 160 | 90.2 | 226.6 | 113.7 | 3.9 | 10.7 |
| 11 | Inline catalyst | 1.6 | 180 | 89.9 | 110.7 | 78.6 | 4.0 | 9.6 |
| 12 | Inline catalyst | 1.6 | 200 | 89.7 | 60.4 | 49.8 | 3.1 | 9.9 |

6. A process to prepare an olefin polymerization catalyst comprising:
　I) Step a): forming a solid product by reacting:
　　i) a diorganomagnesium compound defined by the formula MgRaRb, wherein each of Ra and Rb is independently selected from the group consisting of $C_1$ to $C_8$ hydrocarbyl groups, with
　　ii) a source of active chlorine, wherein the mole ratio of chlorine in said active chlorine to said Mg is less than 2 and the mole ratio of chlorine in said active chlorine to the total moles of (Ra+Rb) is from 1.55 to 1.90/1;
　Step b): collecting said solid product from step a) and separating said solid product from said diorganomagnesium which did not react in said step a); washing said solid product; adding to said solid product a tetravalent titanium chloride species of the formula: $TiCl_n(OR)_m$, wherein n is from 2 to 4 and n+m=4 and wherein OR is a ligand selected from the group consisting of alkoxy, aryloxy and mixtures thereof;
　II) adding an activator.

7. The process of claim 6 wherein said activator is an aluminum hydrocarbyl of the formula $AlR^1{}_x(OR^1)_y$ wherein:
　x is from 1 to 3 and x+y=3
　$R^1$ is $C_1$ to $C_{10}$ hydrocarbyl
　$OR^1$ is an alkoxy or aryloxy.

8. The process of claim 6 wherein the Al/Ti mole ratio is from 0.5/1 to 50/1.

9. A polymerization process for the polymerization of olefins comprising contacting an olefin polymerization catalyst prepared by the process of claim 6 with at least one alpha olefin under polymerization conditions.

10. The process of claim 9 wherein said polymerization conditions are solution polymerization conditions for the copolymerization of ethylene with at least one alpha olefin selected from the group consisting of $C_3$ to $C_8$ alpha olefins.

11. The process of claim 10 wherein said activator is an aluminum hydrocarbyl of the formula $AlR^1{}_x(OR^1)_y$ wherein:
　x is from 1 to 3 and x+y=3
　$R^1$ is $C_1$ to $C_{10}$ hydrocarbyl
　$OR^1$ is an alkoxy or aryloxy.

12. The process of claim 11 wherein the Al/Ti mole ratio is from 0.5/1 to 5/1.

13. The process of claim 9 wherein said tetravalent titanium chloride species is titanium tetrachloride.

* * * * *